(12) United States Patent  
Diab et al.

(10) Patent No.: US 8,385,346 B2
(45) Date of Patent: Feb. 26, 2013

(54) SYSTEM AND METHOD FOR FORMING N0GBASE-T

(75) Inventors: Wael William Diab, San Francisco, CA (US); Scott Powell, Alisa Viejo, CA (US); Kevin Clyde Brown, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 335 days.

(21) Appl. No.: 12/756,597

(22) Filed: Apr. 8, 2010

(65) Prior Publication Data

US 2011/0249687 A1 Oct. 13, 2011

(51) Int. Cl.
*H04L 12/56* (2006.01)

(52) U.S. Cl. .................. 370/394; 370/469; 370/535

(58) Field of Classification Search .................. 370/469, 370/535–545

See application file for complete search history.

(56) References Cited

U.S. PATENT DOCUMENTS

| | | | |
|---|---|---|---|
| 6,873,630 B1 * | 3/2005 | Muller et al. | 370/542 |
| 2006/0045197 A1 * | 3/2006 | Ungerboeck et al. | 375/261 |
| 2007/0076722 A1 * | 4/2007 | Ungerboeck et al. | 370/395.2 |

* cited by examiner

*Primary Examiner* — Pao Sinkantarakorn
(74) *Attorney, Agent, or Firm* — Duane S. Kobayashi (57) ABSTRACT

A system and method for forming N0GBASE-T. In one embodiment, N 10GBASE-T PHYs are matched to a N×10G MAC via a shim layer. The shim layer is designed to distribute data received from a higher rate MAC to multiple lower-rate PHYs on the transmit end, and to collect data received from multiple lower-rate PHYs to a higher rate MAC.

13 Claims, 5 Drawing Sheets

SYSTEM AND METHOD FOR FORMING N0GBASE-T

BACKGROUND

Field of the Invention

The present invention relates generally to Ethernet systems and methods and, more particularly, to a system and method for forming N0GBASE-T.

INTRODUCTION

Ethernet devices continue to evolve in capability as the incremental increases in the standardized transmission rates have progressed by orders of magnitude. In a relatively short period of time, transmission rates for standardized Ethernet devices have progressed from 10 Mbit/s to 100 Mbit/s, from 100 Mbit/s to 1 Gbit/s, and more recently, from 1 Gbit/s to 10 Gbit/s. Efforts are ongoing to identify the next transmission rate that is to be adopted as the next standard of Ethernet performance over structured cabling. Whether 40 Gbit/s or 100 Gbit/s, the next transmission rate over structured cabling will be significantly higher than 10 Gbit/s.

The significant advances in the standardized transmission rates has provided substantial benefits in increasing the available bandwidth in an Ethernet network. These large increases in available bandwidth have enabled significant changes in the applications that can be supported across various types of networks. As the cost of bandwidth has decreased, so also has the performance barriers that have hindered certain types of applications.

Notwithstanding the substantial benefits that have been realized by the large increases in transmission rates, those same large increases in transmission rates can likewise create other cost barriers that can hinder the deployment of some applications. Balancing the benefit of the increased transmission rate are the implementation costs such as system complexity, physical plant improvements (e.g., cabling), increased power consumed, etc. What is needed therefore are solutions that enable increased transmission rates through low-cost implementations.

SUMMARY

A system and/or method for forming N0GBASE-T, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts, including twisted pair, backplane, and optical applications. The inherent simplicity of Ethernet has enabled application of the technology to various mediums, various speeds, and various distances. These features have enabled Ethernet to become a viable technology option that spans high-speed laboratory networks, commercial networks, and increasingly to consumer networks.

As Ethernet is increasingly deployed, the economies of scale have become more attractive. Maintaining the Ethernet solution as a simple, low-cost solution is therefore a key factor in facilitating its continued expanding adoption. Preserving the Ethernet frame format and/or protocol is one factor that can help keep system and end-to-end costs down.

As noted, Ethernet transmission rates have seen rapid advancement with order-of-magnitude increases in transmission rates being made available in new generations of Ethernet devices. These substantial increases in transmission rates come with certain implementation costs, however, as increases in system complexity, increases in costs for physical plant improvements (e.g., cabling), increases in power consumed, etc. have balanced the benefit of the increase in transmission rate. These implementation costs represent real design challenges when considering the next generation of Ethernet devices (e.g., 40 Gbit/s or 100 Gbit/s) over structured cabling.

40 Gbit/s or 100 Gbit/s Ethernet devices for twisted pair applications have not yet been defined. The pace of technological development, however, dictates that such Ethernet devices are already on the near-term horizon. While the bandwidth increase from 10 Gbit/s to 40 Gbit/s or 100 Gbit/s is substantial, so also are the implementation costs of such an advanced solution. These implementation costs can dictate a slow rate of adoption as the development of a low-cost interface based on such technology will take time.

In accordance with the present invention, a cost-effective solution is provided that enables next-generation transmission (i.e., transmission rates beyond 10 Gbit/s) over structured cabling. To illustrate the features of the present invention, reference is first made to FIG. 1, which illustrates the ISO Open System Interconnection (OSI) reference model and its mapping to the IEEE 802.3 layering.

Figure 1:
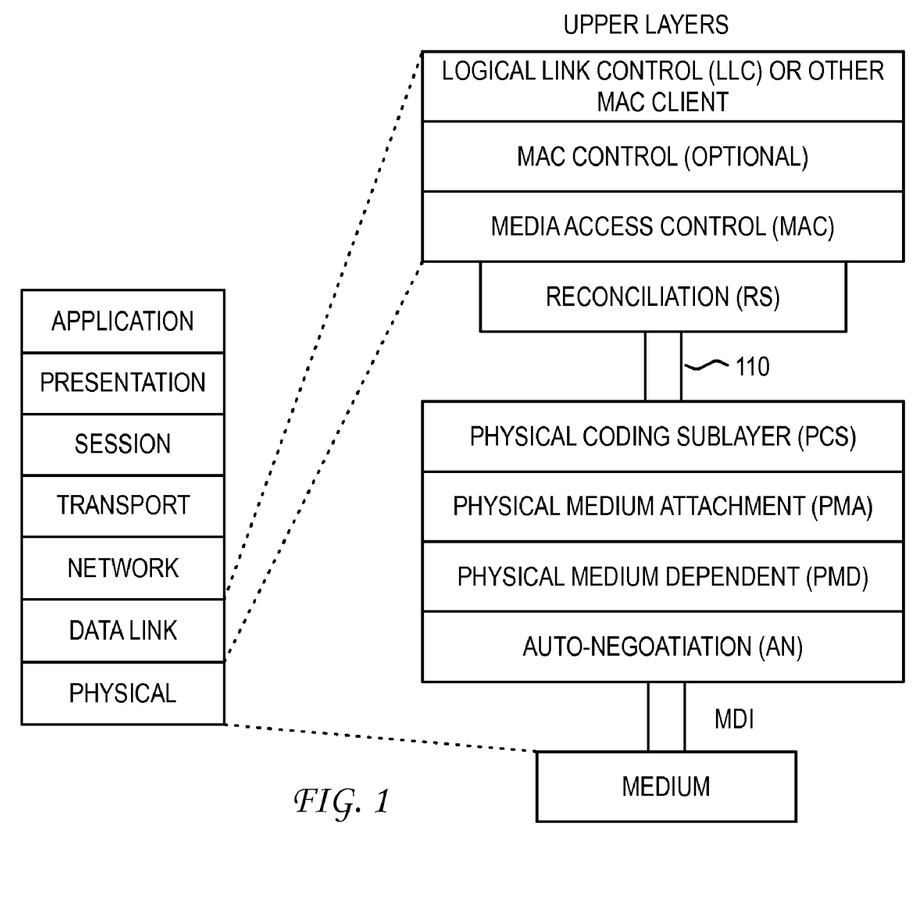
FIG. 1 illustrates an OSI layering diagram.

As illustrated, the PHY includes a physical coding sublayer (PCS), a physical medium attachment (PMA), physical media dependent (PMD), and auto-negotiation (AN). The PHY interfaces with twisted pair cabling over a medium dependent interface (MDI).

As illustrated, the physical layer (often referred to as the PHY) includes a physical coding sublayer (PCS), a physical medium attachment (PMA), physical media dependent (PMD), and auto-negotiation (AN). As illustrated, the PCS is coupled to a reconciliation sublayer (RS), which provides a signal mapping between interface 110 and the MAC layer. In various examples, interface 110 can be based on an Attachment Unit Interface (AUI), media independent interface (MII), serial MII (SMII), reduced MII, (RMII), gigabit MII (GMII), reduced GMII (RGMII), serial GMII (SGMII), quad serial gigabit MII (QSGMII), 10 gigabit MII (XGMII), SXG-MII, XFI, 10-Gbps AUI (XAUI), 40 gigabit MII (XLGMII), 40-Gbps AUI (XLAUI), 100 gigabit MII (CGMII), 10 Gbps AUI (CAUI), or the like. In various embodiments, one or more parts of the PHY can be internal or external to the MAC. In one embodiment, an extender such as the XAUI extender sublayer (XGXS) or XFI can be used between the MAC/PHY. Similar extenders can also be defined for XLAUI and CAUI.

In general, the PMA abstracts the PCS from the physical medium. Accordingly, the PCS can be unaware of the type of medium. The primary functions of the PMA include mapping of transmit and receive code-groups between the PCS and PMA, serialization/de-serialization of code-groups for transmission/reception on the underlying PMD, recovery of clock from the coded data (e.g., 4B/5B, 8B/10B, 64B/65B, 64B/66B, etc.) supplied by the PMD, and mapping of transmit and receive bits between the PMA and PMD.

The PMD is generally responsible for generating electrical or optical signals depending on the nature of the physical medium connected. PMD signals are sent to the medium dependent interface (MDI), which is the actual medium connected, including connectors, for the various media supported.

In general, AN provides a linked device with the capability to detect the abilities (modes of operation) supported by the device at the other end of the link, determine common abilities, and configure for joint operation. Typically, the AN process identifies the best possible mode of operation (or highest common denominator) that is shared by the two PHY devices. Here, a particular priority between different modes of operation can be defined, for example, where a higher speed is preferred over a lower speed, and full duplex is preferred over half duplex at the same speed. AN can also be applied asymmetrically to a link.

In one embodiment, the AN can be designed to support multiple modes. For example, the AN can be designed to support a 40 Gbit/s PHY operating mode in addition to standard operating modes at 10 Mbit/s, 100 Mbit/s, 1 Gbit/s, and 10 Gbit/s over structured cabling. In another embodiment, the AN can be designed to select from a plural set of operating modes that include non-standard operating modes (e.g., 2.5 Gbit/s, 5 Gbit/s, etc. transmission over structured cabling) in addition to the standard operating modes noted above. In yet another embodiment, the AN can be used to autonegotiate to a variable rate. Here, each PHY can test the channel and exchange information regarding the channel (e.g., type of cable, length of cable, etc.), which information can be used to select a particular operating mode. In various examples, the AN process can select a 40 Gbit/s transmission rate if Category 7A cabling is detected, select a 10 Gbit/s transmission rate if Category 6A cabling is detected, select a 40 Gbit/s transmission rate if 15 meters of Category 6A cabling is detected, etc. In general, the AN process can be designed to select an operating mode based not only on the capabilities of the PHYs themselves, but also the capabilities of the particular communication channel between them.

The large number of variations in operating modes is due to the large variations in cabling that can be present. As Ethernet PHY technology has advanced, so also has the cabling technology. To facilitate the higher transmission rates, tighter constraints on the quality of the cabling, connectors and magnetics would dictate the replacement of existing infrastructure.

Various types of Ethernet-compatible cabling exist. For example, performance characteristics represented by Category 3 unshielded twisted pair cabling enable 10BASE-T transmission but not 100BASE-TX transmission, which requires performance characteristics exhibited by Category 5 or 5e cabling. Category 6 cabling was then defined as the cable standard for supporting 1000BASE-T operation. Since that time, cabling advancements have led to advanced Category 6A, 7, 7A, which can support frequencies up to 1 Ghz, and enhanced 7A or newer cabling, which can support frequencies up to 2 Ghz and beyond.

The transmission rate on the twisted pair link is dependent on the channel conditions, which itself is dependent on the type of cabling, length of cabling, connectors, etc. As noted, the newer enhanced 7A cabling has up to 2 Ghz of bandwidth. While this large amount of bandwidth is believed to be sufficient to support 40 Gbit/s transmission, the considerable expense associated with the deployment of such cabling and associated connectors can represent an additional barrier to developing a low-cost 40 Gbit/s solution.

It is a feature of the present invention that the implementation costs along with other development costs incurred in the development of next-generation components can be reduced through a solution that promotes the reuse of architectures in existing Ethernet devices.

Figure 2:
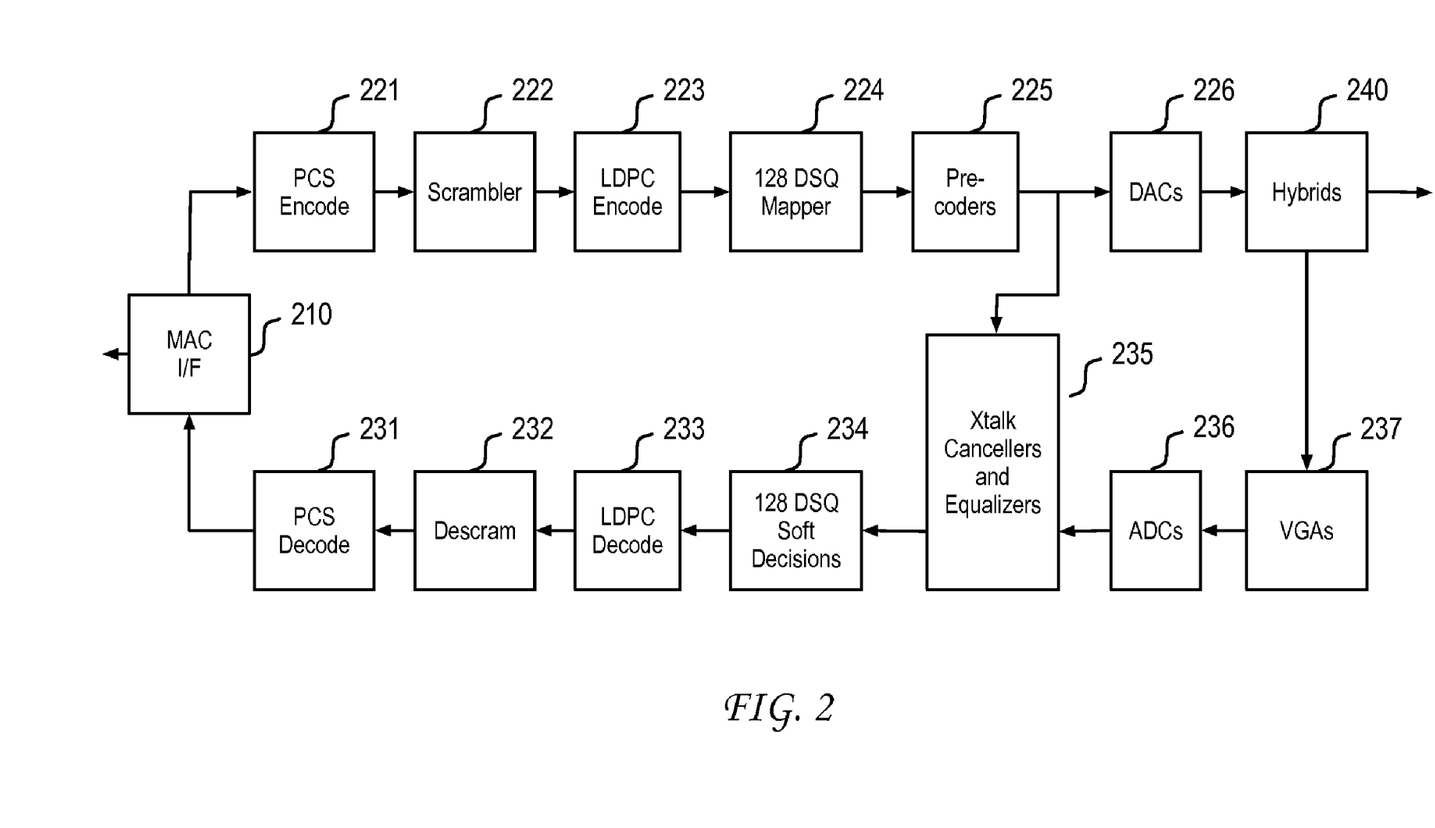
FIG. 2 illustrates an example of an Ethernet physical layer device.

For example, consider FIG. 2, which illustrates an existing Ethernet device architecture for 10 GBASE-T operation. As illustrated, the PHY transceiver includes MAC I/F 210, which can be designed, for example, to support the logical XGMII interface. On the transmission side, the PHY transceiver can include PCS encode 221, Scrambler 222, Low Density Parity Check (LDPC) 223, 128 Double Square (DSQ) Mapper 224, Pre-Coders 225, Digital-Analog Converters (DACs) 226, and Hybrids 240. Correspondingly, on the receiver side, signals received at Hybrids 240, are processed by Variable Gain Amplifiers (VGAs) 237, Analog-Digital Converters (ADCs) 236, Crosstalk (Xtalk) Cancellers and Equalizers 235, 128 DSQ Soft Decisions 234, LDPC Decode 233, Descrambler 232, and PCS decode 231, which delivers signals to MAC I/F 210.

In one embodiment, LDPC encode 223 and LDPC decode 233 implement a (1723, 2048) LDPC encoding/decoding. On the transmit side of the 10 GBASE-T PHY, PCS encode 221 receives a 10 Gbit/s data stream from MAC I/F 210. PCS encode 221 can be designed to implement a 64b/65b coding, which generates 65-bit code groups from 64-bit data.

These 65-bit code groups are then assembled in a group of 50 65-bit blocks. Adding 8 CRC check bits would yield a CRC-checked payload of (50×65)+8=3258 bits. A single auxiliary channel bit can be added to obtain a block of 3259 bits. This set of 3259 bits can then be divided into 3×512 bit groups plus an additional 1723 bits. The 3×512 bits can remain uncoded, while the 1723 bits are encoded by the LDPC (1723, 2048) encoder. The LDPC (1723, 2048) encoder adds 325 LDPC error correction bits to the 1723 bits to form an LDPC codeword of 2048 coded bits. In combination, the 3×512 uncoded bits and the 2048 (i.e., 4×512) coded bits can be arranged in a frame of 7×512 bits. The 7×512 bits can then be mapped by 128 DSQ mapper 224 into symbols selected from the DSQ128 constellation.

In the present invention, it is desired to reuse an existing PHY transceiver, such as that illustrated in FIG. 2, in a device that delivers next-generation transmission rates. The architecture reuse can provide a simple mechanism to increase transmission capacity, while obviating the need to incur the large incremental expenses of transitioning to a newly-designed architecture that supports the next standardized transmission rate or the large incremental expenses of installing a new cabling/connector infrastructure needed to support the next-generation transmission rate.

Figure 3:
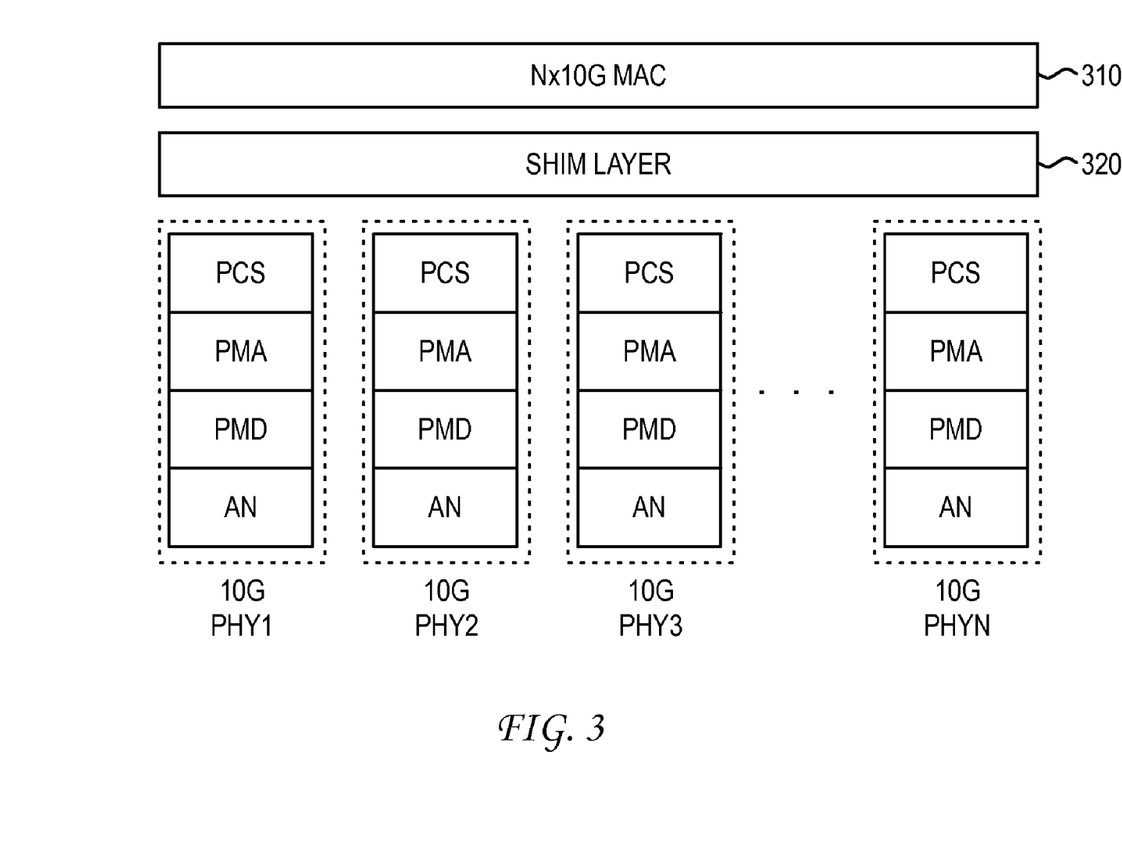
FIG. 3 illustrates an example embodiment of forming N0GBASE-T in an Ethernet physical layer device.

FIG. 3 illustrates an example embodiment of leveraging an existing architecture in a multi-PHY core configuration that produces an N0G PHY. As illustrated, a N0G MAC 310 can be supported by N 10G PHY Cores via shim layer 320, which can include memory/buffering. For example, where N=4, the multi-PHY core configuration can be designed to operate with a 40G MAC. Where N=10, the multi-PHY core configuration can be designed to operate with a 100G MAC. As would be appreciated, the multi-PHY core configuration can be flexibly configured to operate with standardized or non-standardized rate MACs.

Each of the N 10G PHY cores can be embodied substantially with 10 GBASE-T PHY core components, which represent available technology that can be supported by the four wire pairs included in Category 6A or better Ethernet cabling. As such, the higher data transmission rates can be enabled through the provision of additional cables to which the multiple 10G PHYs are connected. For example, where N=4, four 10 GBASE-T PHY cores would be supported by four separate groups of Category 6A or better Ethernet wire pairs that can be bundled together or contained in separate cables. Here, it should be noted that if higher bandwidth cables are used, then the additional bandwidth can be used to transmit the 10GBASE-T frames at a higher rate (e.g., double the rate), thereby enabling a particular N0GBASE-T application to be effected with less physical cables.

As illustrated in FIG. 3, coupling of the N 10G PHY cores to N0G MAC 310 is enabled through shim layer 320. In general, shim layer 320 is designed to present the N 10G data streams generated by the N 10G PHY cores correctly to N0G MAC 310 and to distribute N 10G data streams to the N 10G PHY cores based on a N×10G data stream received from N0G MAC 310. In essence, shim layer 320 performs a collection/distribution function in supporting an interface between a single N0G MAC and multiple 10G PHY cores.

As would be appreciated, the principles of the present invention are not dependent on particular combinations of data transmission rates. For example, while N can vary as noted above, the multi-PHY core configuration can be based on PHY cores that support different standardized (e.g., 1G) or non-standardized transmission rates (e.g., 2.5G). The number of such PHY cores would be dependent on the particular MAC to which the multiple PHY cores are connected via the shim layer.

Using the 40G MAC (i.e., N=4) as an example, shim layer 320 is designed to distribute four 10 Gbit/s data streams that are generated from the 40 Gbit/s data stream produced by the 40G MAC. Each of these 10 Gbit/s data streams can be processed by the four 10G PHY cores that can each implement components from an existing 10 GBASE-T architecture such as that illustrated in FIG. 2. The output of a single 10G PHY core is then transmitted over the four wire pairs in a Category 6A or better Ethernet cable. In this example, four Category 6A or better cables, which each include four wire pairs, would be needed to support the four 10G PHYs.

Figure 4:
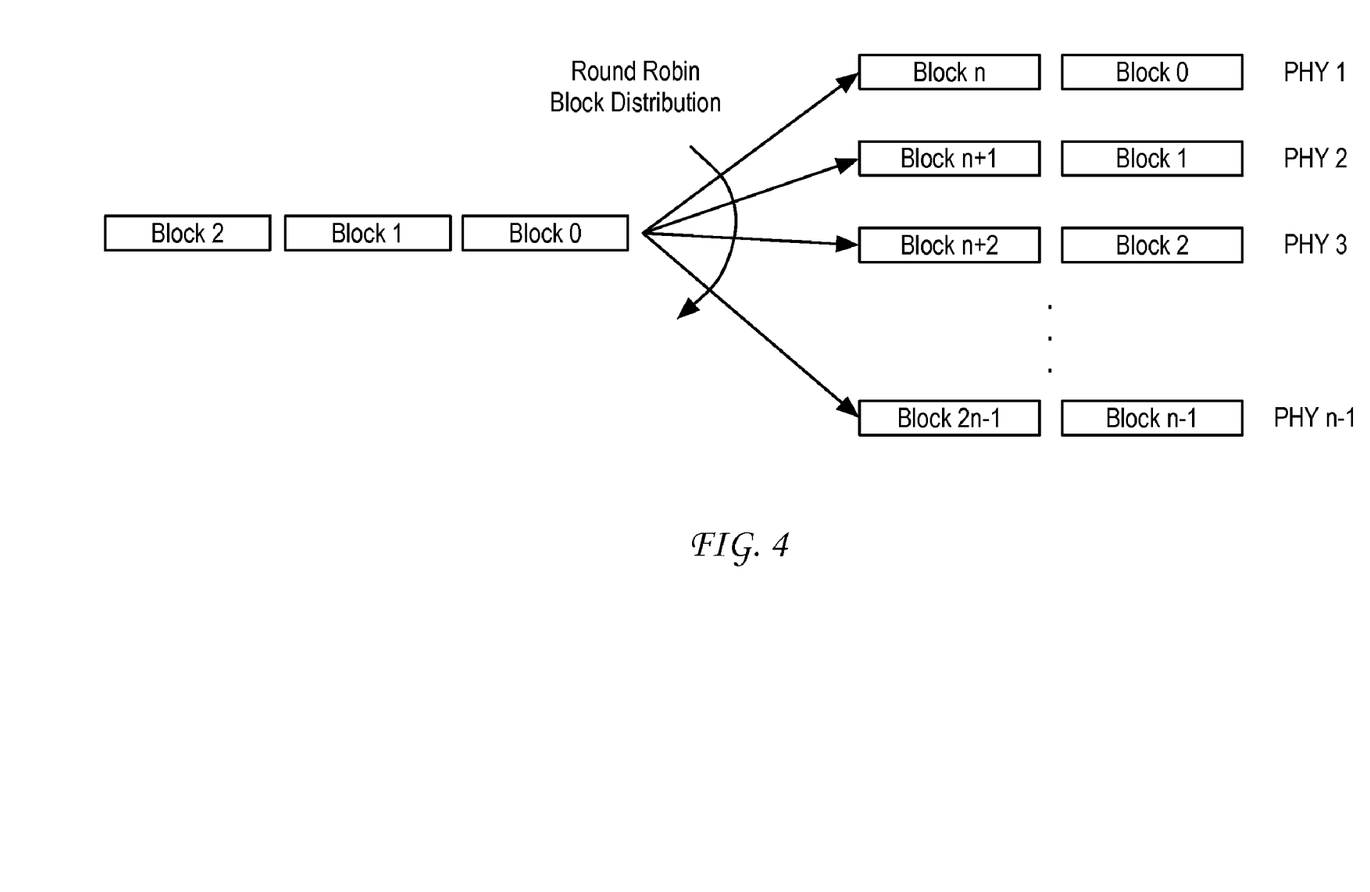
FIG. 4 illustrates an example of multi-PHY distribution.

FIG. 4 illustrates an example of the multi-PHY distribution function that is implemented by shim layer 320. In one embodiment, the multi-PHY distribution is a round-robin block distribution that stripes the incoming data blocks across the N PHY cores. In one example, the round-robin block distribution effectively treats the incoming N0G data stream from the N0G MAC as a multiplexed channel, which is to be demultiplexed into N separate physical paths supported by the N 10G PHY cores. On the receive end, shim layer 320 would be designed to correctly re-assemble the N0G data stream by collecting the re-aligned N 10G streams produced by the N 10G PHY cores.

In general, the multi-PHY distribution function can implement any form of load balancing between the multiple PHY cores. In that regard, the load balancing need not even be equally weighted. A weighted round robin block distribution could also be used where an unbalanced distribution is desired, such as where different transmission rates are used by the different PHY cores.

In one embodiment, the blocks that are distributed by shim layer 320 are uncoded data blocks. For example, in an example of a 40G MAC operating with four 10G PHY cores, shim layer 320 can be designed to deliver 64-bit data blocks. These 64-bit data blocks would be striped across the four 10G PHY cores, wherein the encoding of the 64-bit data blocks into 65-bit data blocks using 64b/65b encoding would be performed by the PCS in each of the 10G PHY cores. In one embodiment, the PCS encoding function can be integrated within shim layer 320 such that shim layer 320 would deliver 65-bit data blocks that would be distributed to each of the 10G PHY cores for LDPC encoding. In general, the specific distribution of PCS functions between the multiple PHYs and shim layer 320 would be implementation dependent.

In one embodiment, regardless of the distribution of PCS functions between the multiple PHY cores and shim layer 320, the multiple PHY cores would be designed to transmit defined LDPC frames over the individual cables. In one embodiment, a reserve channel of additional bits in the LDPC frame can be defined to tag the various LDPC frames from the different 10 GBASE-T channels to thereby enable reassembly of the bits included in the LDPC frames that are transmitted by the multiple PHY cores. This enables the function of shim layer 320 on the receiving end to collect the LDPC frames into a single channel that is delivered to the N0G MAC.

In one embodiment, shim layer 320 can be designed to translate the individual LDPC frames from the multiple PHY cores into a large LDPC frame. In one example, this large LDPC frame can be defined from an organizational/tracking perspective without actually adding additional error-correction coding beyond that defined by the individual PHY cores. In one variation, the shim layer can be designed such that it directly starts to reassemble and stream the data across to the RS (i.e. no need for large LDPC). In another example, the large LDPC frame can be defined and implemented by the shim layer, wherein streams of LDPC coded bits are provided to the individual PHY cores for mapping.

As has been described, multi-PHY distribution and collection using a shim layer promotes architecture reuse. This architecture reuse enables an efficient scaling mechanism, which reduces the large implementation costs of the next-generation of Ethernet devices. One of the advantages of the scaling mechanism is that the shim layer can support multiple speed steps. For example, by using two 10G PHY cores, a 20 Gbit/s link rate can be supported. Where an additional 10G PHY core is operating in a subset 5G mode, a 25 Gbit/s link rate can be supported. Low-cost gradual migration paths can therefore be enabled.

It should be noted that in one embodiment, the shim layer can be enabled or disabled. Enablement of the shim layer allows for the distribution/collection in matching a single higher-rate MAC to multiple lower-rate PHY cores. Disablement of the shim layer, on the other hand, can be designed to match a MAC with a single PHY core in a conventional manner. In the example of a shim layer that distributes/collects data to/from four 10G PHY cores, the enablement of the shim layer facilitates a quad-PHY die that supports four physically separate 10 Gbit/s channels that interface (e.g., XGMII) with a MAC, while the disablement of the shim layer facilitates an activation of only one of the four PHY cores to produce a single PHY that interfaces with the MAC.

In general, the shim layer can be designed to support multiple modes. In the example of a 40G MAC, all four 10G PHY cores can be used for a 40 Gbit/s mode, while only a single 10G PHY core can be used for a 10 Gbit/s mode. If the single 10G PHY core also supports legacy modes, than 2.5 Gbit/s, 1 Gbit/s, 100 Mbit/s, 10 Mbit/s, etc. modes can also be supported by the Ethernet device. Here, the MAC can also be designed to support the legacy modes as well. In one embodiment, the legacy modes supported by the individual PHY cores can also be used in combination to produce a N*(Legacy Speed) rate. In one embodiment, one or more additional PHY cores can be used to provide redundancy for one or more activated PHY cores. Switching can then be done transparently to the MAC.

Figure 5:
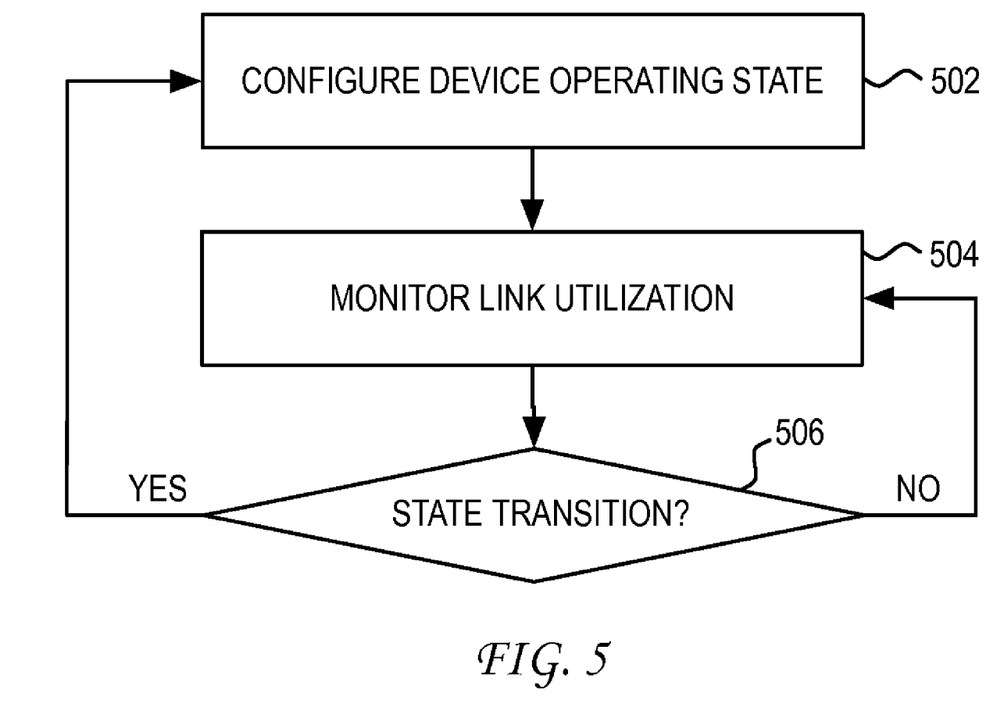
FIG. 5 illustrates a flowchart of a process of the present invention.

FIG. 5 illustrates an example application for which the multiple modes can be used. As noted above, energy costs are a key consideration in any implementation, especially those that support higher transmission rates. Energy efficiency is a key consideration in Ethernet devices as energy costs continue to escalate in a trend that has accelerated in recent years.

As illustrated in FIG. 5, an energy efficient Ethernet (EEE) process begins at step 502 where a shim-layer enabled Ethernet device is configured in an operating state. At startup, for example, the shim-layer enabled Ethernet device can be configured for N0G operation with N 10G baseband transmitters being used. After the shim-layer enabled Ethernet device is configured for N0G operation, the process continues to step 504 where the link utilization is monitored.

In general, the link utilization can be monitored by an EEE control policy that can be designed to determine when to enter a power saving state, what power saving state (i.e., level of power savings) to enter, how long to remain in that power saving state, what power saving state to transition to out of the previous power saving state, etc. An EEE control policy entity can include software code that can interoperate with one or more layers, including portions of the PHY, MAC, switch, or other subsystems in the host. The EEE control policy entity can be enabled to analyze traffic on the physical link and to analyze operations and/or processing of data in itself or in its link partner. In this manner, the EEE control policy entity can exchange information from, or pertaining to, one or more layers of the OSI hierarchy in order to establish and/or implement the EEE control policy. The software-based EEE control policy can be designed to base its decisions on a combination of static settings established by an IT manager, default software configuration, properties of the traffic bandwidth on the link itself, time of day, or by some other set of fixed parameters. For example, the EEE control policy can be designed to examine empty or non-empty conditions of ports, queues, buffers, etc. to determine whether to transition to or from a power saving state.

At step 506, while the link utilization is monitored, it is then determined whether the monitored link utilization indicates a state transition is needed. If it is determined that a state transition is not needed, then the process continues to monitor the link utilization. If, on the other hand, it is determined that a state transition is needed, the process then continues back to step 502 where the shim-layer enabled Ethernet device's operating state is configured. Here, the shim-layer enabled Ethernet device can be configured to transition from the previous active N0G state to a low power state. In one embodiment, the low power state of the shim-layer enabled Ethernet device can be configured by lowering the power consumption of one or more of the 10G PHY cores. For example, one or more of the 10G PHY cores can be turned off, thereby causing the shim-layer enabled Ethernet device to operate in a lower power operating state. The shim-layer enabled Ethernet device can continue in this low power operating state until the link utilization indicates that a return to the active N0G operating state is required. In various embodiments, the low power state can be embodied as a low power idle (LPI) mode, a subset PHY mode, or a combination thereof.

As has been described, the shim-layer enabled Ethernet device can support a variety of operating modes that can support different configurations at startup or during active operation. The flexibility of the operating modes is enabled by architecture reuse that enables efficient scaling.

In a startup application, the multiple modes can be used as part of the auto-negotiation process where the highest rate can be selected based on factors such as the number of channels/twisted pairs that are available, the cable types (e.g., Category 6, 6A, 7, 7A, etc.), the length of one or more cables, etc. For example, the auto configuration process can configure a four PHY core device to operate at 25G if three cables are available, wherein two cables can support a 10G channel, and one cable can support a 5G channel. As would be appreciated, the cable types and length of the cables can be determined using cable diagnostics prior to configuration.

It should be noted that the 40G/10G examples described above are not intended to be limiting in the scalability afforded by the architecture reuse. For example, M 1G baseband transmitters can be used to produce a shim-layer enabled M*1G Ethernet device.

It should also be noted that the principles of the present invention are not to be construed to be limited to the 10G example PHY architecture of FIG. 2. More generally, the principles of the present invention can be applied to any existing architecture, including, 10 Mbit/s, 100 Mbit/s, 1 Gbit/s, 10 Gbit/s (e.g., 10 GBASE-KR, KX4, CR1), 40 Gbit/s (e.g., 40 GBASE-CR4), 100 Gbit/s (e.g., 100 GBASE-CR10), etc. systems. In that regard, the principles of the present invention can also be applied to various standard, non-standard (e.g., 2.5 Gbit/s, 5 Gbit/s, 20-30 Gbit/s, etc.), or future (e.g., 40 Gbit/s, 100 Gbit/s, greater than 100 Gbit/s, etc.) link rate systems. The principles of the present invention can also be applied to shared media links like passive optical networks (PONs).

In one embodiment, a variable rate shim-layer enabled Ethernet device can be generated that is responsive to the channel properties (e.g., type of cable, length of cable, bundling constraints, etc.) discovered by the channel diagnostics. This information can then be used to select the particular number and combination of PHY cores to facilitate the bandwidth needs relative to the particular channel. In general, the particular device implementation would be dependent on the PHY cores being used and the amount of cabling available. As would be appreciated, the principles of the present invention can also be applied asymmetrically to a link.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A 40 Gbit/s Ethernet communication device, comprising:
a shim layer, said shim layer receiving an incoming bit stream and striping said incoming bit stream into a plurality of subrate bit streams;
a plurality of (1723, 2048) low density parity check encoders, each of said plurality of (1723, 2048) low density parity check encoders generating low density parity check encoder frames using a bit stream based on a separate one of said plurality of subrate bit streams generated by said shim layer, wherein said shim layer distributes 64-bit data to a plurality of encoders that are associated with said plurality of (1723, 2048) low density parity check encoders, said plurality of encoders generating 65-bit code groups for use by said plurality of (1723, 2048) low density parity check encoders based on said distributed 64-bit data; and
a plurality of 10 Gbit/s transceivers, each of said plurality of 10 Gbit/s transceivers corresponding to one of said plurality of (1723, 2048) low density parity check encoders and being configured to transmit low density parity check encoder frames, wherein each transmitted low density parity check encoder frame includes a reserve channel that includes a plurality of bits that specifies a tag for a low density parity check encoder frame, said tag enabling reassembly of said low density parity check encoder frames at a link partner device.

2. The device of claim 1, wherein said plurality of 10 Gbit/s transceivers are 10GBASE-T transceivers.

3. The device of claim 1, further comprising an energy efficiency control policy that controls a transition by one or more of said plurality of 10 Gbit/s transceivers from an active state to a low power state based on link utilization levels.

4. The device of claim 1, wherein said striping is based on round robin distribution.

5. A 40 Gbit/s Ethernet communication device, comprising:
a shim layer, said shim layer including a low density parity check encoder that generates a low density parity check encoder frame based on an incoming bit stream received by said shim layer, said shim layer dividing said low density parity check encoder frame into a plurality of low density parity check encoder frame parts, wherein said low density parity check encoder frame parts are based on a distribution of 64-bit data blocks that have been encoded into 65-bit code groups for delivery to a plurality of (1723, 2048) low density parity check encoders; and
a plurality of 10 Gbit/s transceivers, each of said plurality of 10 Gbit/s transceivers being configured to receive a low density parity check encoder frame part and to transmit said received low density parity check encoder frame part to a link partner device, wherein said link partner device reassembles said plurality of low density parity check encoder frame parts into said low density parity check encoder frame.

6. The device of claim 5, further comprising an energy efficiency control policy that controls a transition by one or more of said plurality of 10 Gbit/s transceivers from an active state to a low power state based on link utilization levels.

7. The device of claim 6, wherein said low power state is a low power idle state.

8. The device of claim 6, wherein said low power state is a subset physical layer device state.

9. The device of claim 6, wherein each of said plurality of 10 Gbit/s transceivers transmits over a twisted wire pair communication channel.

10. A method, comprising:
striping, using a shim layer, an incoming bit stream into a plurality of 64-bit data blocks;
distributing, by said shim layer, 64-bit data blocks to a plurality of encoders that are associated with a plurality of (1723, 2048) low density parity check encoders, said plurality of encoders generating 65-bit code groups for use by said plurality of (1723, 2048) low density parity check encoders based on said distributed 64-bit data blocks;
generating, using a first (1723, 2048) low density parity check encoder, a first low density parity check encoder frame using a first 64-bit data block, said first low density parity check encoder frame including a first reserve channel that includes a first plurality of bits that specifies a first tag for said first low density parity check encoder frame;
generating, using a second (1723, 2048) low density parity check encoder, a second low density parity check encoder frame using a second 64-bit data block, said second low density parity check encoder frame including a second reserve channel that includes a second plurality of bits that specifies a second tag for said second low density parity check encoder frame;
transmitting, to a link partner device using a first 10 Gbit/s transceiver, a first output based on said first low density parity check encoder frame; and transmitting, to said link partner device using a second 10 Gbit/s transceiver, a second output based on said second low density parity check encoder frame, wherein said first tag and said second tag are used by said link partner device to order said first and second low density parity check encoder frames.

11. The method of claim 10, wherein said first and second 10 Gbit/s transceivers are 10GBASE-T transceivers.

12. The method of claim 10, further transitioning one of said first and second 10 Gbit/s transceivers from an active state to a low power state based on link utilization levels monitored by an energy efficiency control policy.

13. The method of claim 10, wherein said striping is based on round robin distribution.

* * * * *